(12) United States Patent
Suzuki et al.

(10) Patent No.: US 6,986,824 B2
(45) Date of Patent: Jan. 17, 2006

(54) PROCESS AND APPARATUS FOR FORMING IMAGES

(75) Inventors: Kenji Suzuki, Kawasaki (JP); Toru Nagata, Tokyo (JP); Yoshinari Yasui, Chigasaki (JP); Hiroshi Ochiai, Samukawa-machi (JP); Hiroshi Miyamura, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/365,510

(22) Filed: Aug. 2, 1999

(65) Prior Publication Data

US 2002/0088538 A1 Jul. 11, 2002

(30) Foreign Application Priority Data

Aug. 4, 1998 (JP) .......................................... 10-220507

(51) Int. Cl.
*B32B 31/20* (2006.01)
*B41J 29/00* (2006.01)

(52) U.S. Cl. ................ 156/277; 156/308.2; 400/120.18
(58) Field of Classification Search ................ 156/277, 156/308.2, 384, 387, 556, 583.1
See application file for complete search history.

(56) References Cited

U.S. PATENT DOCUMENTS

| | | | | |
|---|---|---|---|---|
| 4,521,785 A | * | 6/1985 | Matsufuji | |
| 4,595,931 A | * | 6/1986 | Toganoh et al. | |
| 4,756,963 A | * | 7/1988 | Yamamoto et al. | 428/32.81 |
| 4,864,324 A | * | 9/1989 | Shirota et al. | |
| 4,865,675 A | * | 9/1989 | Yamamoto et al. | |
| 4,978,560 A | * | 12/1990 | Stone | 347/212 |
| 5,019,203 A | * | 5/1991 | Singer | |
| 5,210,581 A | * | 5/1993 | Kuzuya | 156/277 X |
| 5,306,381 A | * | 4/1994 | Nakazawa et al. | 156/384 X |
| 5,364,702 A | * | 11/1994 | Idei et al. | |
| 5,368,677 A | * | 11/1994 | Ueda et al. | 156/387 X |
| 5,392,104 A | * | 2/1995 | Johnson | 156/277 X |
| 5,521,002 A | * | 5/1996 | Sneed | |
| 5,715,507 A | * | 2/1998 | Kobayashi et al. | |
| 5,750,200 A | * | 5/1998 | Ogawa et al. | |
| 5,891,824 A | * | 4/1999 | Simpson et al. | 503/227 |
| 6,007,660 A | * | 12/1999 | Forkert | |
| 6,095,220 A | * | 8/2000 | Kobayashi et al. | |
| 6,174,404 B1 | * | 1/2001 | Klinger | 156/277 |
| 6,180,219 B1 | * | 1/2001 | Hoshino et al. | |
| 6,650,350 B2 | * | 11/2003 | Suzuki et al. | 347/212 |
| 6,663,238 B2 | * | 12/2003 | Kikuchi et al. | 347/102 |

FOREIGN PATENT DOCUMENTS

| | | | |
|---|---|---|---|
| JP | 59-91079 | * | 5/1984 |
| JP | 3-112626 | * | 5/1991 |
| JP | 5-269949 | * | 10/1993 |
| JP | 10-44605 | * | 2/1998 |

* cited by examiner

*Primary Examiner*—Melvin Mayes
(74) *Attorney, Agent, or Firm*—Fitzpatrick, Cella, Harper & Scinto

(57) ABSTRACT

An image forming process comprises the steps of conducting recording on a recording medium provided with an image-receiving layer and laminating a thermoplastic film onto the image-receiving layer to smooth the surface of the thermoplastic film by a heating and pressurizing device and to bond the back side of the thermoplastic film onto the image-receiving layer. An image forming apparatus comprises an ink-jet head for conducting recording on a recording medium, a laminating section for laminating a thermoplastic polymer onto a recorded recording medium, and a heating and pressurizing device for heating and pressurizing the thermoplastic film to smooth the surface and to bond the back side of the thermoplastic film onto the image-receiving layer.

8 Claims, 2 Drawing Sheets

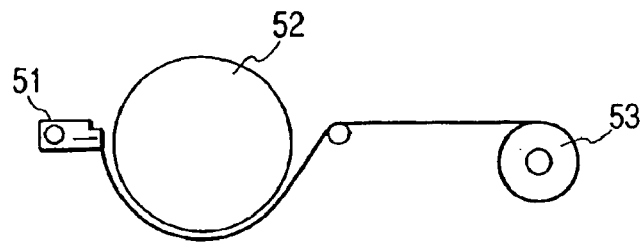
FIG. 2A
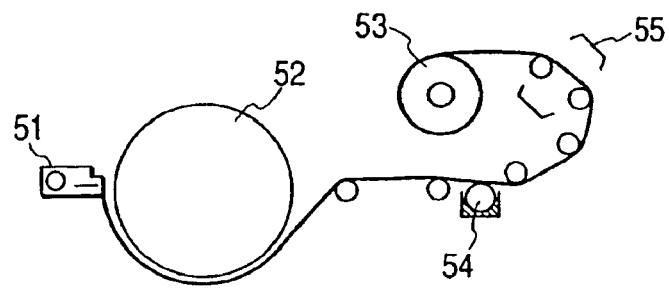
FIG. 2B
FIG. 3A
(PRIOR ART)
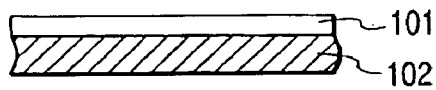
FIG. 3B
(PRIOR ART)
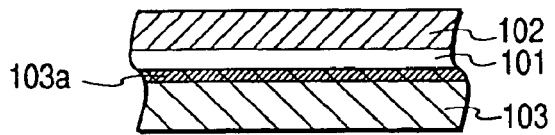
FIG. 3C
(PRIOR ART)
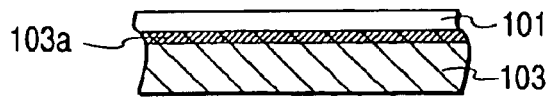

PROCESS AND APPARATUS FOR FORMING IMAGES

BACKGROUND OF THE INVENTION

1. Field of the Invention

The present invention relates to an image forming process for forming a protective layer of a thermoplastic resin film on a recording medium and an image forming apparatus for carrying out this process.

2. Related Background Art

In recent years, the technique of ink-jet recording has made noteworthy progress and the resultant image quality has reached a level equal or superior to that of a silver halide print. A known recording media used for this ink-jet recording process includes an image-receiving layer on a base material such as paper. This layer contains porous particles excellent at absorbing and fixing recording liquid.

Also utilized is a laminating treatment of a recorded image which provides waterproof characteristics, light resistance and glossiness. This treatment is achieved by transferring and laminating a transfer layer, comprised of a layer of thermoplastic resin on a base material, onto a recorded image by heat and pressure adhesion. By having a UV absorbing agent contained in the transfer layer during this treatment, it is also possible to provide a print with sufficient light resistance.

Furthermore, many resin-using laminating treatments of an image have been established for easily providing wear resistance, solvent resistance, or the like, by devising the material and construction of this transfer layer.

FIGS. 3A to 3C are schematic sectional views of a conventional laminating method. The film with a base material shown in FIG. 3A basically comprises a transfer layer 101 to be transferred and laminated onto the surface of a recorded image and a base material film 102 for bearing the transfer layer 101. The transfer layer 101 can be peeled off from the base material film 102 so as to be transferred and laminated onto the image-receiving layer of a recording medium after recording.

As shown in FIG. 3B, the transfer layer 101 is laminated while remaining borne on the base material film 102. The transfer layer 101 directly covers the top of the image-receiving layer 103a on an ink-jet image-receiving paper 103 after recording and is then applied onto the image-receiving layer 103a by pressurization and/or fusion.

As shown in FIG. 3C, the base material film 102 is peeled off from the transfer layer 101 after the transfer layer is applied onto the recorded image, and the transfer layer 101 alone is left as a protective layer on the image-receiving layer 103a.

The principal problem of the construction comprising a transfer layer 101 and a base material film 102, as shown in FIGS. 3A, 3B and 3C, is high cost. In a laminating treatment as discussed above, the base material film 102 must be comprised of a heat resistant material on which a resin layer to be transferred by heat and pressure adhesion on the recording side is formed by coating. In addition, this base material film 102 must exhibit flatness sufficient for giving the gloss of a protective film after the transfer. The cost of this base material film 102 is higher than that of either a transfer material which remains as a final product or a coating of a transfer layer. Some sufficiently stable and deformation-free raw materials for a protective layer, with conditions assumed for thermal transfer, and in which pre-annealing controls thermal shrinkage, include PET film, polyamide film, and polyimide film. Each of these materials is of high-cost and thus a wide variety of low-cost, general purpose applications are difficult to create.

The second problem of this construction is that the base material film 102 becomes waste once used. To minimize processing costs, coating of the transfer layer 101 is ordinarily executed on a wide roll before slitting. Thus, recycling of used base material film 102 cannot be directly performed. If used base material film 102 was recycled, it would be done on the raw material level. Thus, there would be labor costs for collecting and recycling them in addition to expenses including a mechanism for rewinding a film after the image transfer in an apparatus, a space for housing the mechanism, and a power source or control system for moving the mechanism. If a laminate material has been cut, winding is unnecessary, but a mechanism for carrying used base material film 102 and accumulating it in a predetermined space is still necessary.

The third problem of this construction is that the function of a protective layer transferred and formed varies according to factors including physical properties, surface properties, and thickness. These especially affect the glossiness, the adhesion of a film and the bubble releasability. The transfer process of a glossy protective layer is a complicated process to which many parameters contribute, and the addition of such influential variable factors is unfavorable.

SUMMARY OF THE INVENTION

It is an object of the present invention to provide an image forming process and an image forming apparatus capable of solving the problems mentioned above, while forming a glossy image at a low cost and free of used wastes.

An image forming process according to the present invention comprises the steps of conducting recording on a recording medium with an image-receiving layer and laminating a thermoplastic film onto the image-receiving layer to smooth the surface of the thermoplastic film by heating and pressurizing means.

An image forming apparatus according to the present invention comprises: an ink-jet head for conducting recording on a recording medium, a laminating section for laminating a thermoplastic polymer onto a recording medium on which recording has been conducted, and a means for heating and pressurizing the thermoplastic film to smooth the surface.

In the present invention, a thermoplastic resin film is laminated without use of a base material film, as has been previously used. Additionally, the surface of a protective layer is smoothed during the lamination, resulting in reduced costs and glossy recorded images.

Further, by eliminating the base material film, a heating means applies heat directly to the laminated film, thereby reducing the thermal load of the apparatus.

BRIEF DESCRIPTION OF THE DRAWINGS

FIGS. 2A and 2B are illustrations of an example of a device for manufacturing a thermoplastic film used in the present invention.

FIGS. 3A, 3B and 3C are illustrations of an example of a method for laminating a laminate film with a base material attached.

DETAILED DESCRIPTION OF THE PREFERRED EMBODIMENTS

Figure 1:
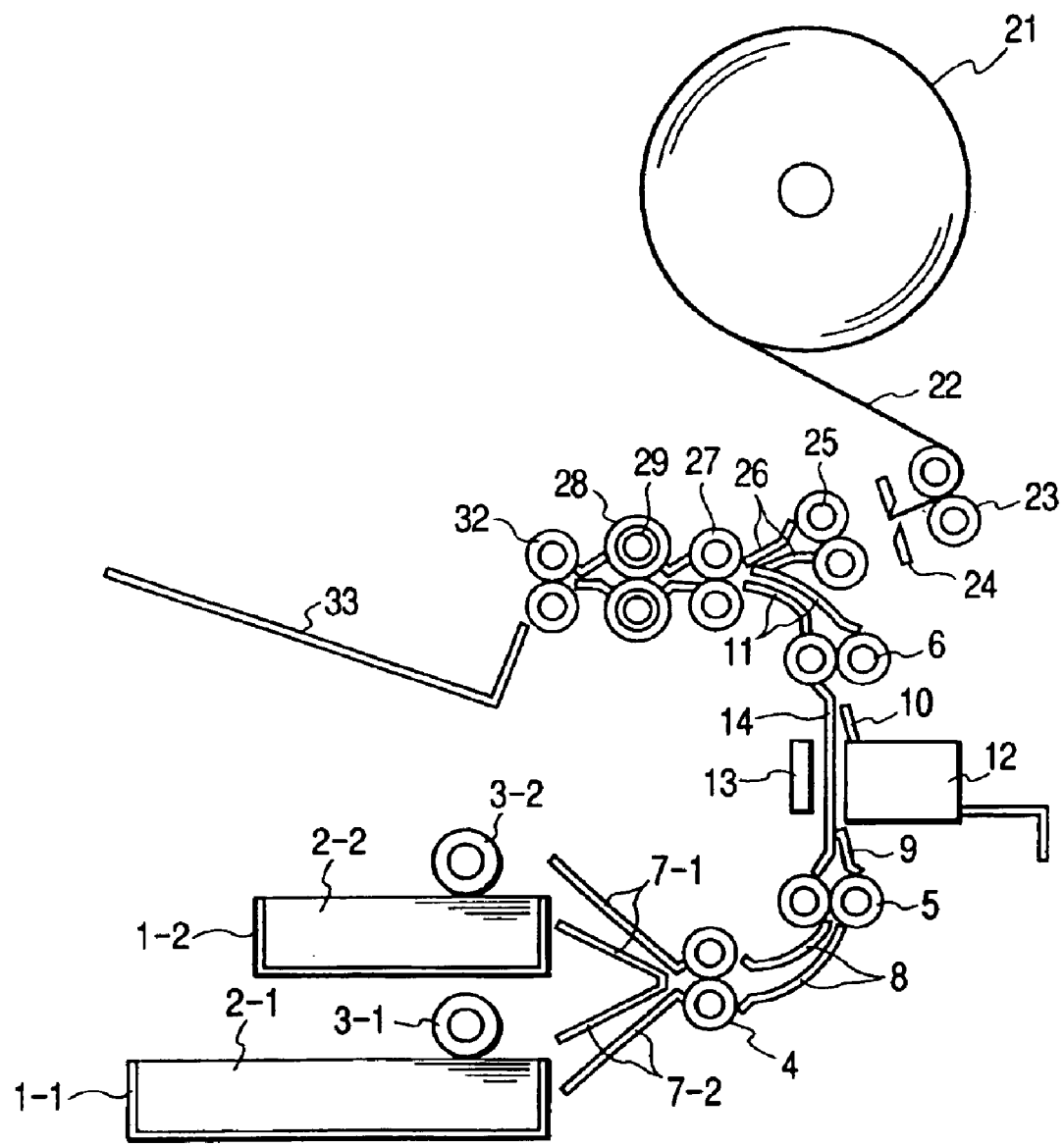
FIG. 1 is an illustration of an example of an image forming apparatus according to the present invention.

In the apparatus shown in FIG. 1, recording media 2-1 and 2-2, different in size, are fed from storing cassettes 1-1 and 1-2 by means of first and second feed rollers 3-1 and 3-2. Furthermore, through conveyance guides 7-1 and 7-2, rollers 4, 5 a conveyance guide 8, rollers 5 and a conveyance guide 9, recording media 2-1 and 2-2 arrive at an ink-jet recording head 12. Here, in accordance with an image signal from unshown image reader means, images are recorded on the image-receiving layer of the recording media 2-1 and 2-2. The ink-jet recording head 12 is composed of so-called multi-heads arranged in a full line, for example, nearly perpendicular to the recording media 2-1 and 2-2, i.e. perpendicular to the paper plane in FIG. 1. In this ink-jet recording, the recording media 2-1 and 2-2 are suctioned to a porous guide plate 14 by a suction fan 13. The guide plate acts to retain the planarity of the recording media and to maintain an established gap with the recording head 12.

Then, the recording media 2-1 and 2-2 after recording are conveyed through a conveyance guide 10, conveyance rollers 6 and a conveyance guide 11 to a laminating section.

Further, a long-scale thermoplastic resin film 22 is wound onto a drum 20 shaped thermoplastic resin film feed section 21. This thermoplastic resin film 22 has a width corresponding to a length perpendicular to the conveying direction of the recording media 2-1 and 2-2. This thermoplastic resin film 22 is fed from the feed section 21 through feed rollers 23, a cutter 24, conveyance rollers 25 and conveyance rollers 26 where it overlaps with the recorded recording media 2-1 and 2-2 by means of rollers 27. The thermoplastic resin film 22 is then cut to a desired length by means of the cutter 24.

The overlapped portions of recording media 2-1 and 2-2 and thermoplastic resin film 22 are then conveyed to pressurizing roller 28 which contains a heater 29. They are then heated and pressurized for adhesion. More specifically, the thermoplastic resin film 22 is laminated and then bonded onto the image-receiving layer of the recording media 2-1 and 2-2. The laminated recording media 2-1 and 2-2 are then discharged through rollers 32 to a discharge tray 33.

When smoothing the surface of the protective layer for improving glossiness of images, the pressurizing rollers 28 serve as heating and pressurizing means to smooth the surface on the side in contact with the thermoplastic resin film 22. In order to obtain glossy images, the surface roughness of the pressurizing rollers is preferably about 3 $\mu$m or less in terms of Ra, and more preferably about 1.5 $\mu$m or less.

In the present invention, because of directly determining the glossiness of the transfer protective layer, and accordingly, of recorded images, the surface glossiness of the rollers is an important factor. This glossiness varies with image requirements, but a glossiness equal to or greater than 10% at an incident angle of 20° and equal to or greater than 70% at an incident angle of 75° is generally preferred.

In addition, the temperature supplied by the heating and pressurizing means will vary with different material compositions of the thermoplastic resin film 22, but a range of 60° C. to 220° C. is ordinarily preferred.

Heat resistant rubber is the preferred surface material for the pressurizing rollers 28 on the side of the thermoplastic resin film. With a metal roller, once flaws are generated on the surface, their shapes are transferred, but by applying pressure to a rubber material, the durability is significantly improved. Furthermore, silicon rubber is preferred for mold releasability. Applying traces of silicon oil is also effective for maintaining and significantly improving the mold releasability.

Devices used for forming a protective layer in the present invention are not limited to the example shown in FIG. 1. In another possible embodiment, a charged drum is used as an intermediate carrier and a device arranged so as to push this charged drum wrapped with thermoplastic film 22 therearound to the recording media 2-1 and 2-2 can be also employed.

Any thermoplastic film which can be laminated on a recorded image-receiving layer of a recording medium may be employed as the thermoplastic resin film in the present invention. Thermoplastic resin films having preferable characteristics for lamination such as transparency, breaking strength and melting point have to be appropriately selected for use. Specifically, films of vinyl chloride-vinyl acetate copolymer, polyethylene, polypropylene, polyvinyl chloride, polystyrene, polyesters, polyvinyl alcohols, polyamides, cellulose acetate, polycarbonates, polyvinyl butyral, vinylidene chloride or the like can be utilized.

Also, it is preferred either that the glass transition point of the thermoplastic resin film is lower than that of a binder resin of an image-receiving layer in a recording medium or that the film-forming temperature of the thermoplastic resin film is lower than that of a binder resin of an image-receiving layer in a recording medium.

The thickness of a thermoplastic resin film may be determined appropriately, but it should preferably be of such thickness that the unevenness of the surface of the image-receiving layer in a recording medium does not appear on the surface of the thermoplastic resin film. Specifically, a range of 2 to 40 $\mu$m is preferred.

Further, a thermoplastic resin film may be composed of a laminate of different thermoplastic polymer layers. In this case, ordinarily, the glass transition point or film-forming temperature varies among the thermoplastic polymer layers. Thus, a thermoplastic layer significantly lower in glass transition point or film-forming temperature may be laminated onto the image-receiving layer. Also in this case, the thickness of a thermoplastic polymer layer on the laminated side of the image-receiving layer should preferably be of such thickness that the unevenness of the surface of the image-receiving layer does not appear on the surface of the thermoplastic resin film. Specifically, a range of 1 to 20 $\mu$m is preferred for such a thermoplastic polymer layer thickness, while the total thickness of the thermoplastic resin film is preferably in the range between 2 and 40 $\mu$m.

By using a polymer material with a low glass transition point for the polymer laycr on the side directly laminated onto an image-receiving layer, a resin can be arranged so as to firmly intrude into concave portions of an uneven image-receiving layer. By additionally using a polymer material with a high glass transition point and molecular weight for the layer on the opposite side, the surface hardness of the laminate layer can be enhanced. Such a multiple layer composition is also advantageous for preventing inter-layer fusion in the stock of a thermoplastic resin film which is wound in the shape of a roll.

FIGS. 2A and 2B are schematic illustrations exemplifying a process for manufacturing a thermoplastic resin film used in the present invention.

FIG. 2A shows an example of manufacturing a monolayer thermoplastic resin film. As shown in FIG. 2A, a monolayer thermoplastic resin film is obtained by supplying a thermoplastic resin material from a dye coating head 51 to a casting roll 52 and winding a shaped film on a winding roll 53. By using a casting roll 52 in this manner, the film surface is well smoothed, thus resulting in images further improved in glossiness after the formation of a protective layer.

FIG. 2B shows an example of manufacturing a double layer thermoplastic resin film. As shown in FIG. 2B, a double layer thermoplastic resin film is obtained. by supplying a thermoplastic resin material from a dye coating head 51 to a casting roll 52, coating a second layer by means of a micro gravure coating head 54, drying the coat in a drying furnace 55, and winding the shaped film on a winding roll 53.

The examples shown in FIGS. 2A and 2B are arranged to wind a manufactured thermoplastic resin film in the shape of a roll and laminate this rolled thermoplastic resin film onto an image-receiving layer installed at the supply section 21 of the laminating apparatus shown in FIG. 1. But, another arrangement could continuously supply a thermoplastic resin film from the casting roll 52 to the apparatus shown in FIG. 1 without being wound in the shape of a roll.

The image-receiving layer of a recording medium used in the present invention is mainly composed of porous inorganic particles and binder resin such that 30 to 1000 parts by weight, but preferably 50 to 500 parts by weight of binder resin, is employed with respect to 100 parts by weight of porous inorganic particles.

For porous inorganic particles, preferred are those containing a large amount of pores having 3 to 30 nm diameter in the structure. Especially desirable are those having large pore density near the particle surface. Further, for obtaining a sufficient ink absorption rate, the specific surface area of porous inorganic particles is preferably 50 $m^2/g$ or larger. Also, for high-speed ink-jet printers, the image-receiving layer of a recording medium preferably contains a minimum of 50% by weight porous inorganic particles with a specific area of 100 $m^2/g$ or greater for preventing the overflow of ink.

Further, the porous inorganic particles endowed with such an ink solvent absorptivity and dye-molecule absorptivity preferably are white in color. Materials comprising porous inorganic particles having such characteristics include metals such as aluminum, magnesium and silicon, as well as metal oxides, hydrates and carbonates. Above all, synthetic silica is particularly preferred due to its excellency in all the characteristics mentioned above, established use in industrial production processes, inexpensiveness, and stability.

With an image-receiving layer comprising a mixture of such inorganic particles and an organic binder resin, not quite small diameter inorganic particles are preferred for ink absorptivity. In many cases, inorganic particles in the range of 0.1 to 10 $\mu$m in diameter are employed and not sufficiently small relative to the wavelength of light. Thus, a matted appearance results from light scattering which takes place on the surface. Of these particles, ultrafine particles in the range of 0.1 to 1 $\mu$m in diameter can sometimes reduce matting and provide a glossy surface. But usually, a secondary aggregation of particles occurs, so that the surface cannot be sufficiently smoothed. Also, if a dispersant is added to the coating liquid to prevent aggregation, the absorptivity of ink and/or the stability of dye molecules are often damaged.

For these reasons, the resulting surface of a recording medium containing such porous inorganic particles, in which a high-speed absorptivity of ink and a coloring stability of dyes have been desired, is normally matted. The present invention displays considerable meritorious effects for using a recording medium containing such image-receiving layers.

Hereinafter, examples of the present invention will be described.

EXAMPLE 1

Two parts of binder resin emulsion (Takamatsu Yushi; NS120-XK) was added to one part of silica (Mizusawa Chemical Industries; Mizukasil P-50). Thereafter, the mixture was dispersed to prepare a coating liquid in which the solid content became 20% by weight. This coating liquid was then coated and dried onto a fine paper of 186 $g/m^2$ using a slot-dye coater. After drying, the film became a 30 $\mu$m thick image-receiving layer.

Next, an 8 $\mu$m thick thermoplastic resin film made of vinyl chloride-vinyl acetate copolymer was used for ink-jet recording and the formation of a protective layer. For this, the apparatus shown in FIG. 1 was used. The film-forming temperature of the film material was 60° C. The temperature of pressurizing rollers 28 having a silicon rubber surface during lamination was set to 140° C. and the glossiness of the pressurizing roller 28 on the side of the thermoplastic resin film was set to 80% at an incident angle of 75°. As a result, exceptionally glossy recording images were obtained.

COMPARATIVE EXAMPLE 1

The same vinyl chloride-vinyl acetate copolymer as used in Example 1 was coated on a 38 $\mu$m thick polyethylene terephthalate film with the same thickness, thereby preparing a film with a base material as shown in FIGS. 3A to 3C. The unevenness of the polyethylene terephthalate film was the same as that of the pressurizing rollers used in Example 1. Using this film, inkjet recording and the formation of a protective layer were carried out as in Example 1, but three times the heating energy of that in Example 1 was required to obtain the same glossiness as in Example 1.

As clearly seen from the results of Example 1 and Comparative Example 1, the present invention does not use a film with a base material prepared by laminating a material for lamination onto a heat resistant film as in Comparative Example 1, but directly laminates only a material for lamination using rollers by heat and pressure adhesion. This achieves high thermal efficiency and makes it possible to obtain favorably glossy recorded images at a low cost.

EXAMPLE 2

Except for the following, ink jet recording and formation of a protective layer were carried out as in Example 1: a thermoplastic resin film comprising two layers of a 3 $\mu$m thick low molecular weight acrylic resin and a 10 $\mu$m thick layer of vinyl chloride-vinyl acetate copolymer was used, the temperature of pressurizing rollers 28 was set to 120° C., and the side of vinyl chloride-vinyl acetate copolymer was brought into contact with the image-receiving layer. Similarly desirable results were obtained.

In this example, it is important to fully plasticize the acrylic resin layer with the pressurizing rollers 28. Thereby, the lower vinyl chloride-vinyl acetate copolymer layer is sufficiently dissolved into the upper acrylic resin layer, thus making the interface disappear. Therefore, the density of recorded images can be improved by eliminating the light scattering on the interface between the above two layers. Also, the blocking of a relatively high Tg acrylic resin layer is prevented so that a highly uniform film is obtained.

As described above, according to the present invention, a thermoplastic resin film without a base material is laminated and the surface of a protective layer is smoothed during laminating, so that a desirably glossy protective layer can be formed at a low cost and without waste.

Moreover, since a film itself is laminated and the laminated film does not have a base material, a heating means directly transmits heat thereby reducing the thermal load of the apparatus.

What is claimed is:

1. A process for forming images comprising the steps of:

conducting recording on a recording medium provided with an image-receiving layer, the image-receiving layer containing inorganic particles having a diameter of 0.1 to 10 µm for imparting a matted appearance to the surface of the image receiving layer, laminating a laminating film supplied from a roll, having a thickness of 2 to 40 µm and consisting of a thermoplastic resin film composed of two thermoplastic polymer layers onto the image-receiving layer, the glass transition point of one of the polymer layers on the side directly laminated onto the image-receiving layer being lower than that of the other of the polymer layers on the side opposite to the image-receiving layer; and plasticizing and smoothing the surface of the thermoplastic resin film that is opposite to the surface in contact with the image-receiving layer with heating and pressurizing means to bond a back side of the thermoplastic resin film onto the image-receiving layer.

2. A process for forming images as set forth in claim 1, wherein a surface glossiness of the heating and pressurizing means is equal to or greater than 10% at an incident angle of 20°.

3. A process for forming images as set forth in claim 2, wherein the surface glossiness is equal to or greater than 70% at an incident angle of 75°.

4. A process for forming images as set forth in claim 1, wherein said laminating step and said plasticizing and smoothing step are conducted at the same time.

5. A process for forming images as set forth in claim 1, wherein the surface, which comes into contact with the thermoplastic resin film, of the heating and pressurizing means is of a rubber material.

6. A process for forming images as set forth in claim 1, wherein the surface, which comes into contact with the thermoplastic resin film, of the heating and pressurizing means is of a silicon rubber.

7. A process for forming images as set forth in claim 1, wherein the surface roughness (Ra) of the surface of the heating and pressurizing means that comes into contact with the thermoplastic resin film is 3 µm or less.

8. A process for forming images as set forth in claim 1, wherein the thermoplastic resin film is composed of a layer of vinyl chloride-vinyl acetate copolymer on the side directly laminated onto the image-receiving layer and a layer of an acrylic resin on the side opposite to the image-receiving layer.

* * * * *

UNITED STATES PATENT AND TRADEMARK OFFICE
CERTIFICATE OF CORRECTION

PATENT NO. : 6,986,824 B2  Page 1 of 1
APPLICATION NO. : 09/365510
DATED : January 17, 2006
INVENTOR(S) : Suzuki et al.

It is certified that error appears in the above-identified patent and that said Letters Patent is hereby corrected as shown below:

ON THE COVER PAGE
At Item (*) Notice, insert the following paragraph:
--This patent issued on a continued prosecution application filed under 37 CFR 1.53(d), and is subject to the twenty year patent term provisions of 35 U.S.C. 154(a)(2).--.

COLUMN 1
Lines 28 and 29 should be merged in a single paragraph.

COLUMN 3
Line 3, "4,5 a" should read --4, a--.
Line 19, "drum 20 shaped" should read --drum-shaped--.

COLUMN 7
Line 7, "layer," should read --layer;--.

Signed and Sealed this

Fifth Day of December, 2006

JON W. DUDAS
*Director of the United States Patent and Trademark Office*